US012693714B2

(12) United States Patent
Yang et al.

(10) Patent No.: US 12,693,714 B2
(45) Date of Patent: Jul. 28, 2026

(54) ELECTRONIC DEVICE

(71) Applicant: VIVO MOBILE COMMUNICATION CO., LTD., Dongguan (CN)

(72) Inventors: Dingjian Yang, Dongguan (CN); Ninglin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 178 days.

(21) Appl. No.: 18/752,750

(22) Filed: Jun. 24, 2024

(65) Prior Publication Data

US 2024/0345631 A1     Oct. 17, 2024

Related U.S. Application Data

(63) Continuation of application No. PCT/CN2022/142744, filed on Dec. 28, 2022.

(51) Int. Cl.
G06F 1/16          (2006.01)

(52) U.S. Cl.
CPC .......... G06F 1/1681 (2013.01); G06F 1/1616 (2013.01); G06F 1/1647 (2013.01); G06F 1/1652 (2013.01); G06F 1/1656 (2013.01)

(58) Field of Classification Search
CPC .... G06F 1/1616; G06F 1/1652; G06F 1/1656; G06F 1/1681; H04M 1/022; H04M 1/0222
See application file for complete search history.

(56) References Cited

U.S. PATENT DOCUMENTS

| | | | |
|---|---|---|---|
| 10,480,225 B1 * | 11/2019 | Hsu | ........................ G06F 1/1616 |
| 12,541,230 B2 * | 2/2026 | Liao | ....................... G06F 1/1681 |
| 2020/0341509 A1 | 10/2020 | Wu et al. | |
| 2020/0355216 A1 | 11/2020 | Bae et al. | |

(Continued)

FOREIGN PATENT DOCUMENTS

| | | |
|---|---|---|
| CN | 110958337 A | 4/2020 |
| CN | 110992833 A | 4/2020 |

(Continued)

OTHER PUBLICATIONS

Extended European Search Report issued in related European Application No. 22914897.8, mailed Feb. 28, 2025, 8 pages.

(Continued)

*Primary Examiner* — Anthony Q Edwards
(74) *Attorney, Agent, or Firm* — IPX PLLC

(57)          ABSTRACT

This application provides an electronic device, including a first device body, a second device body, a rotating mechanism, and a flexible display screen. The flexible display screen comprises a first display screen, a second display screen, and a third display screen. The first device body is rotatably connected to the second device body by the rotating mechanism. The first display screen is connected to the second display screen through the third display screen. The first device body is connected to the first display screen, and the second device body is connected to the second display screen. The rotating mechanism comprises at least one rotating shaft and a transmission apparatus, and the at least one rotating shaft is connected to at least one of the first device body or the second device body through the transmission apparatus.

13 Claims, 8 Drawing Sheets

(56)        References Cited

U.S. PATENT DOCUMENTS

| | | | | |
|---|---|---|---|---|
| 2020/0363843 | A1* | 11/2020 | Cheng | G06F 1/1681 |
| 2022/0071035 | A1* | 3/2022 | Zhang | G09F 9/301 |
| 2023/0209752 | A1* | 6/2023 | Yun | G06F 1/1652 |
| | | | | 361/807 |
| 2023/0337379 | A1* | 10/2023 | Dong | H05K 5/0226 |
| 2025/0258522 | A1* | 8/2025 | Zhang | G06F 1/1652 |

FOREIGN PATENT DOCUMENTS

| | | | |
|---|---|---|---|
| CN | 113794792 A | 12/2021 | |
| CN | 114244934 A | 3/2022 | |

OTHER PUBLICATIONS

International Search Report and Written Opinion issued in corresponding International Application No. PCT/CN2022/142744, mailed Mar. 20, 2023, 9 pages.
First Office Action issue in related Chinese Application No. 202111644899.7, mailed Oct. 12, 2023, 4 pages.
Second Office Action issue in related Chinese Application No. 202111644899.7, mailed Apr. 12, 2024, 5 pages.

* cited by examiner

ELECTRONIC DEVICE

CROSS-REFERENCE TO RELATED APPLICATIONS

This application is a continuation of International Application No. PCT/CN2022/142744, filed on Dec. 28, 2022, which claims priority to Chinese Patent Application No. 202111644899.7 filed on Dec. 29, 2021. The entire contents of each of the above-referenced applications are expressly incorporated herein by reference.

TECHNICAL FIELD

This application pertains to the field of communication technologies, in particular, to an electronic device.

BACKGROUND

With development of communication technologies, a size of a display screen of an electronic device becomes increasingly large. A larger display screen can not only improve an aesthetics of the electronic device, but also bring better visual impact to a user, so as to improve use experience of the electronic device.

However, as the size of the display screen increases, an overall size of the electronic device also becomes larger, which is not convenient for the user to carry. A foldable-screen electronic device appears on a market currently. A display screen of the electronic device is a flexible display screen. Therefore, a size of a display area can be changed by folding and unfolding the electronic device, so that a larger display area can be obtained, and a size of the electronic device can be reduced by folding the electronic device, so as to make it convenient for the user to carry.

However, due to an influence of a bending radius of the electronic device, in a process of folding or unfolding the electronic device, the flexible display screen is prone to be wrinkled and layered due to excessive squeezing, or fractured due to excessive stretching. Therefore, the electronic device has a problem of a short service life of the flexible display screen thereof.

SUMMARY

Embodiments of this application are intended to provide an electronic device.

To resolve the foregoing technical problem, this application is implemented as follows.

Embodiments of this application provide an electronic device, including a first device body, a second device body, a rotating mechanism, and a flexible display screen. The flexible display screen includes a first display screen, a second display screen, and a third display screen.

The first device body is rotatably connected to the second device body by using the rotating mechanism.

The first display screen is connected to the second display screen through the third display screen.

The first device body is connected to the first display screen, and the second device body is connected to the second display screen.

The rotating mechanism includes at least one rotating shaft and a transmission apparatus, and the at least one rotating shaft is connected to at least one of the first device body or the second device body through the transmission apparatus.

The first device body and the second device body may rotate relative to each other to enable the electronic device to be switched between a folded state and an unfolded state. In a case that the electronic device is switched from the folded state to the unfolded state, the at least one rotating shaft drives, through the transmission apparatus, at least one of the first device body or the second device body away from the rotating shafts. In a case that the electronic device is switched from the unfolded state to the folded state, the at least one rotating shaft drives, through the transmission apparatus, at least one of the first device body or the second device body toward the at least one rotating shaft.

In embodiments of this application, in a case that the electronic device is switched from the folded state to the unfolded state, the at least one rotating shaft drives, through the transmission apparatus, at least one of the first device body or the second device body away from the at least one rotating shaft, so that a support length of the first device body and the second device body for the flexible display screen increases, so as to prevent the third display screen of the flexible display screen from being wrinkled and layered due to squeezing. In a case that the electronic device is switched from the unfolded state to the folded state, the at least one rotating shaft drives, through the transmission apparatus, at least one of the first device body or the second device body toward the at least one rotating shaft, so that the support length of the first device body and the second device body for the flexible display screen decreases, so as to prevent the third display screen of the flexible display screen from being fractured due to excessive stretching. It can be learned that the first device body and the second device body may move relative to the rotating shafts with folding or unfolding of the electronic device, so that the flexible display screen is not damaged due to folding or unfolding of the electronic device. Therefore, a service life of the flexible display screen is longer.

REFERENCE NUMERALS

110—first device body, 120—second device body, 101—first support part, 102—second support part, 103—first sliding slot, 104—second sliding slot;
210—first shaft, 220—second shaft;
300—rotating mechanism, 310—transmission apparatus, 311—lead screw, 315—first bevel gear, 316—second bevel gear, 320—first moving member, 330—second moving member, 301—body part, 302—first connecting part, 303—second connecting part, 304—slider, 305—slot, 306—insertion protrusion, 340—support plate, 341—first gear part, 342—second gear part, 343—first mounting part, 344—second mounting part, 345—first mounting hole, 346—second mounting hole, 347—accommodating hole, 350—rotating shaft bracket, 351—arc-shaped support surface, 360—bearing, 370—threaded screw;
400—flexible display screen, 410—first display screen, 420—second display screen, 430—third display screen.

DETAILED DESCRIPTION

The following describes technical solutions in embodiments of this application with reference to the accompanying drawings in embodiments of this application. Apparently, the described embodiments are some but not all of embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in such a way is interchangeable in proper circumstances, so that the embodiments of this application can be implemented in an order other than the order illustrated or described herein. In addition, in this specification and the claims, "and/or" represents at least one of connected objects, and a character "/" generally represents an "or" relationship between associated objects.

With reference to the accompanying drawings, an electronic device provided in the embodiments of this application is described below in detail by using specific embodiments and application scenarios thereof.

Figure 1:
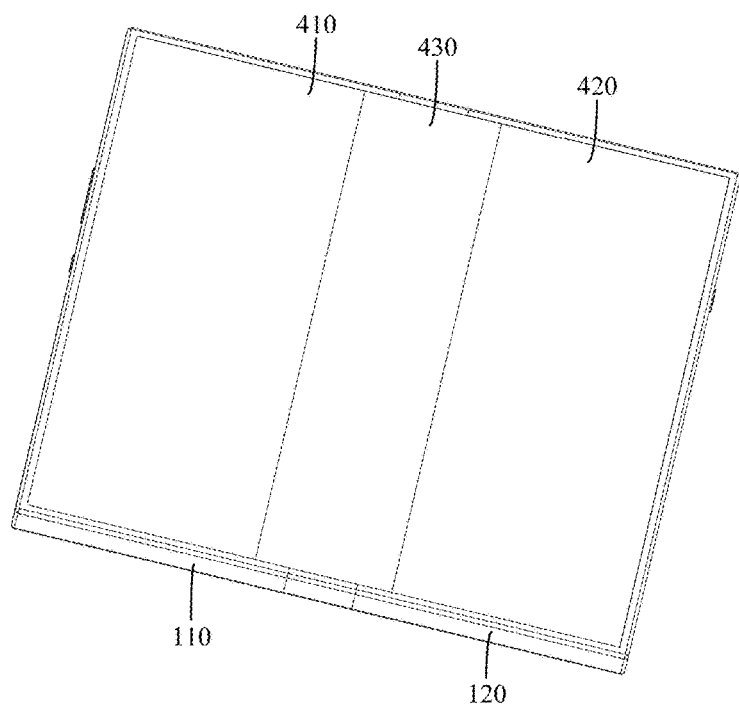
FIG. 1 is a schematic diagram of a structure when an electronic device disclosed in an embodiment of this application is in an unfolded state.
Figure 2:
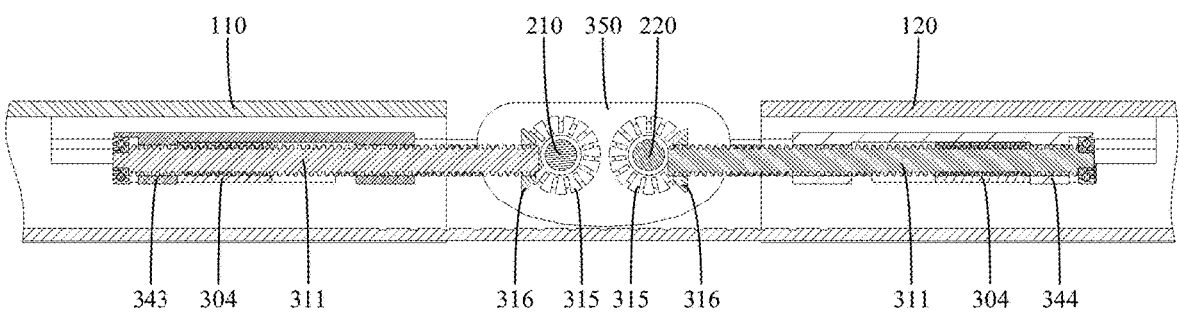
FIG. 2 and FIG. 3 each are partial sectional views at different locations when an electronic device disclosed in an embodiment of this application is in an unfolded state.
Figure 3:
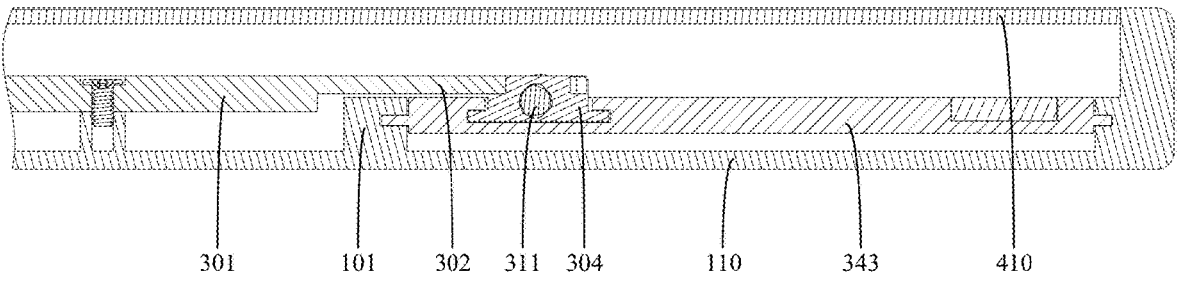
Figure 4:
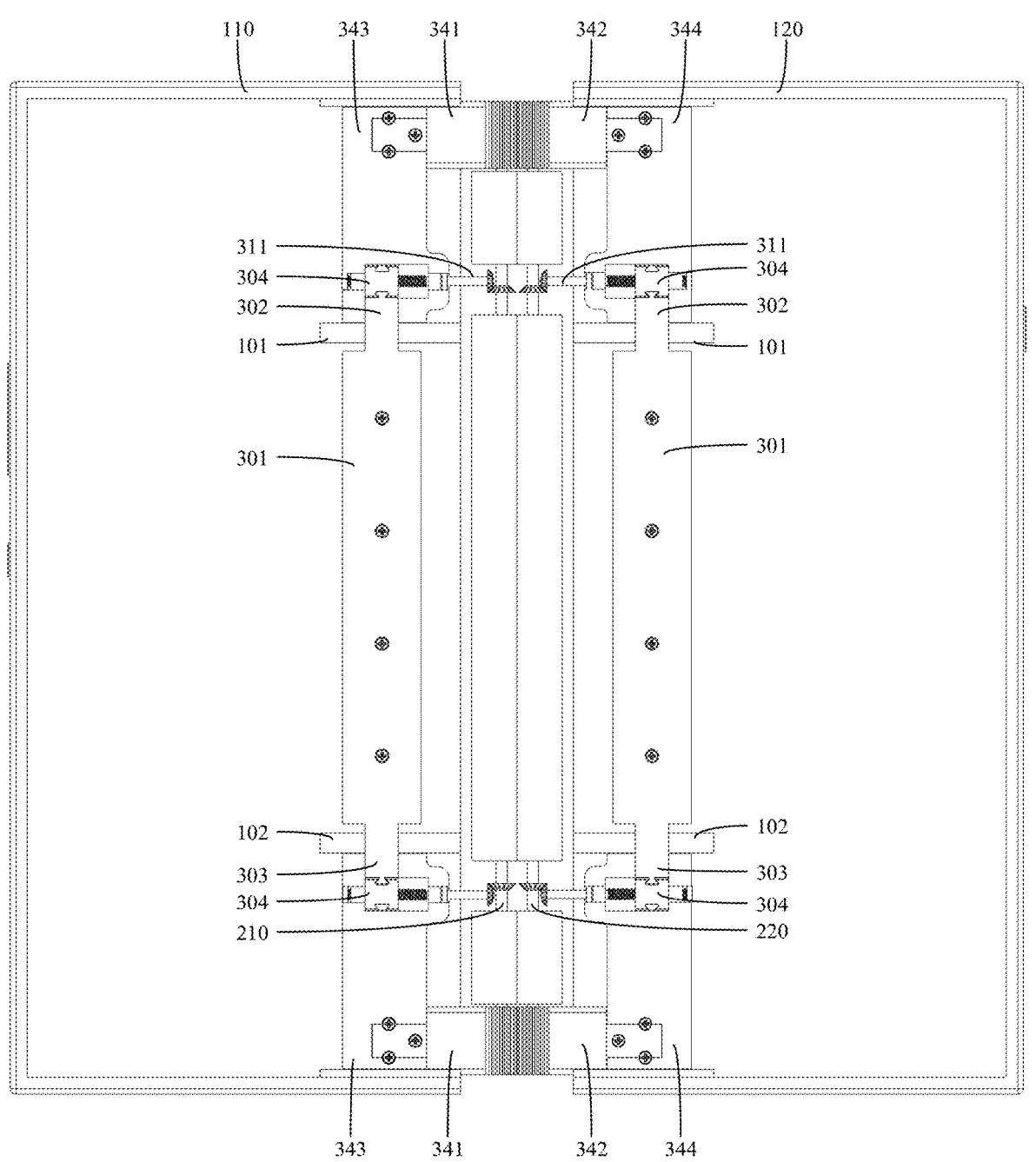
FIG. 4 is a schematic diagram of a partial structure of an electronic device disclosed in an embodiment of this application when the electronic device is in an unfolded state.
Figure 5:
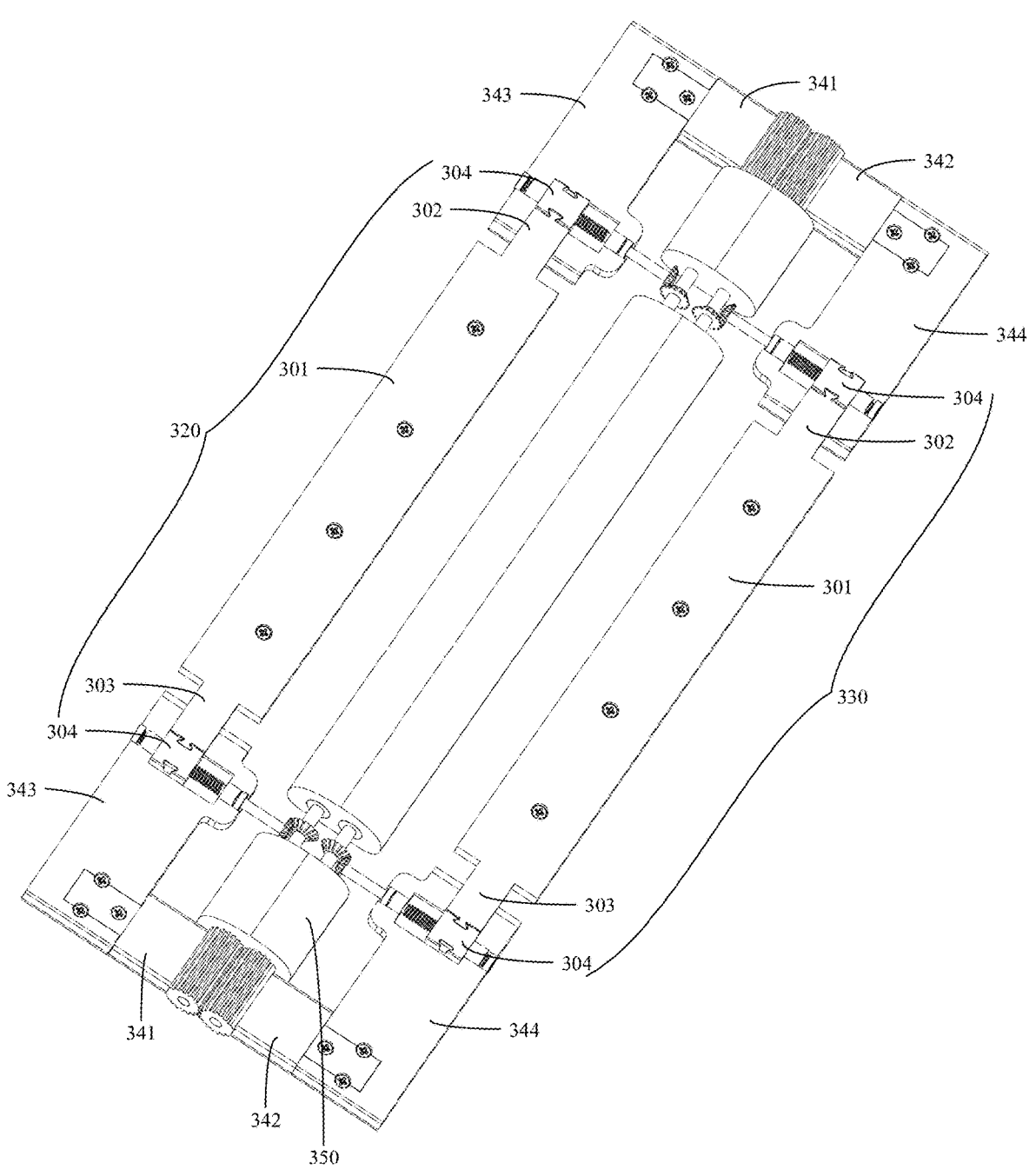
FIG. 5 is a schematic diagram of a structure of rotating shafts and a rotating mechanism when an electronic device disclosed in an embodiment of this application is in an unfolded state.
Figure 6:
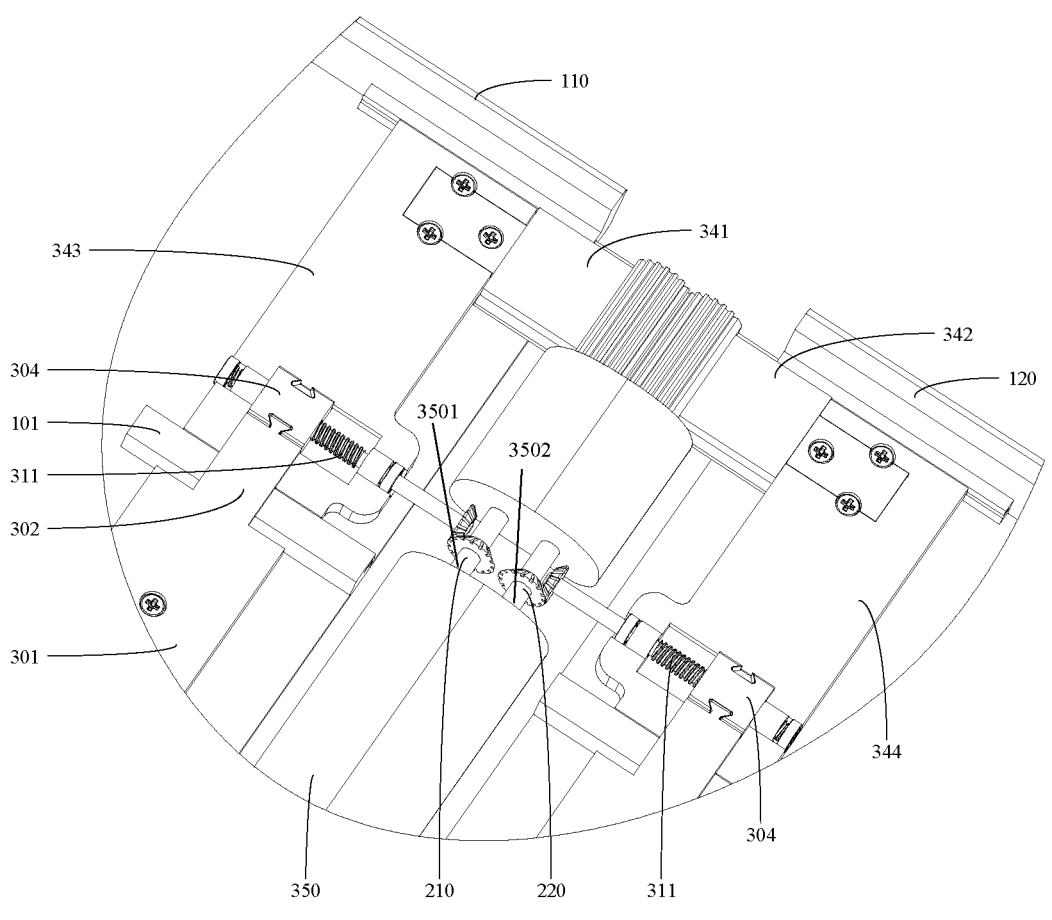
FIG. 6 is a partial enlargement view when an electronic device disclosed in an embodiment of this application is in an unfolded state.
Figure 7:
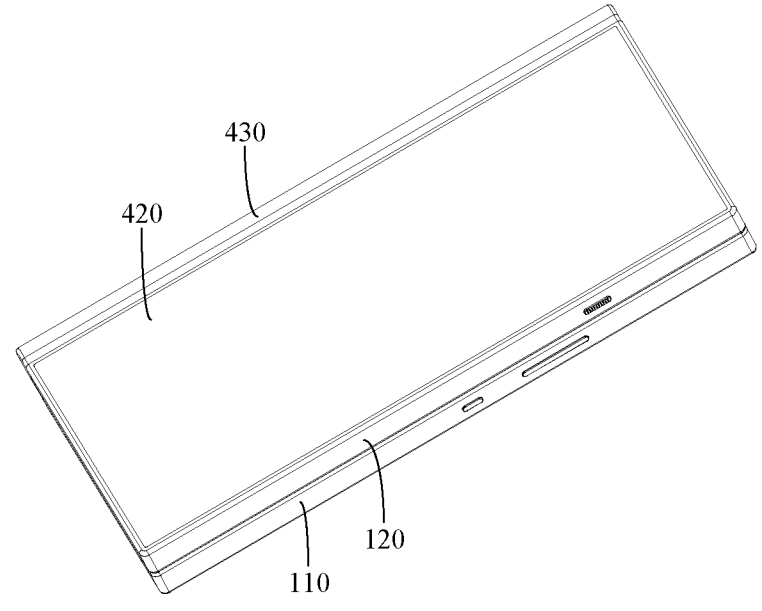
FIG. 7 is a schematic diagram of a structure when an electronic device disclosed in an embodiment of this application is in a folded state.
Figure 8:
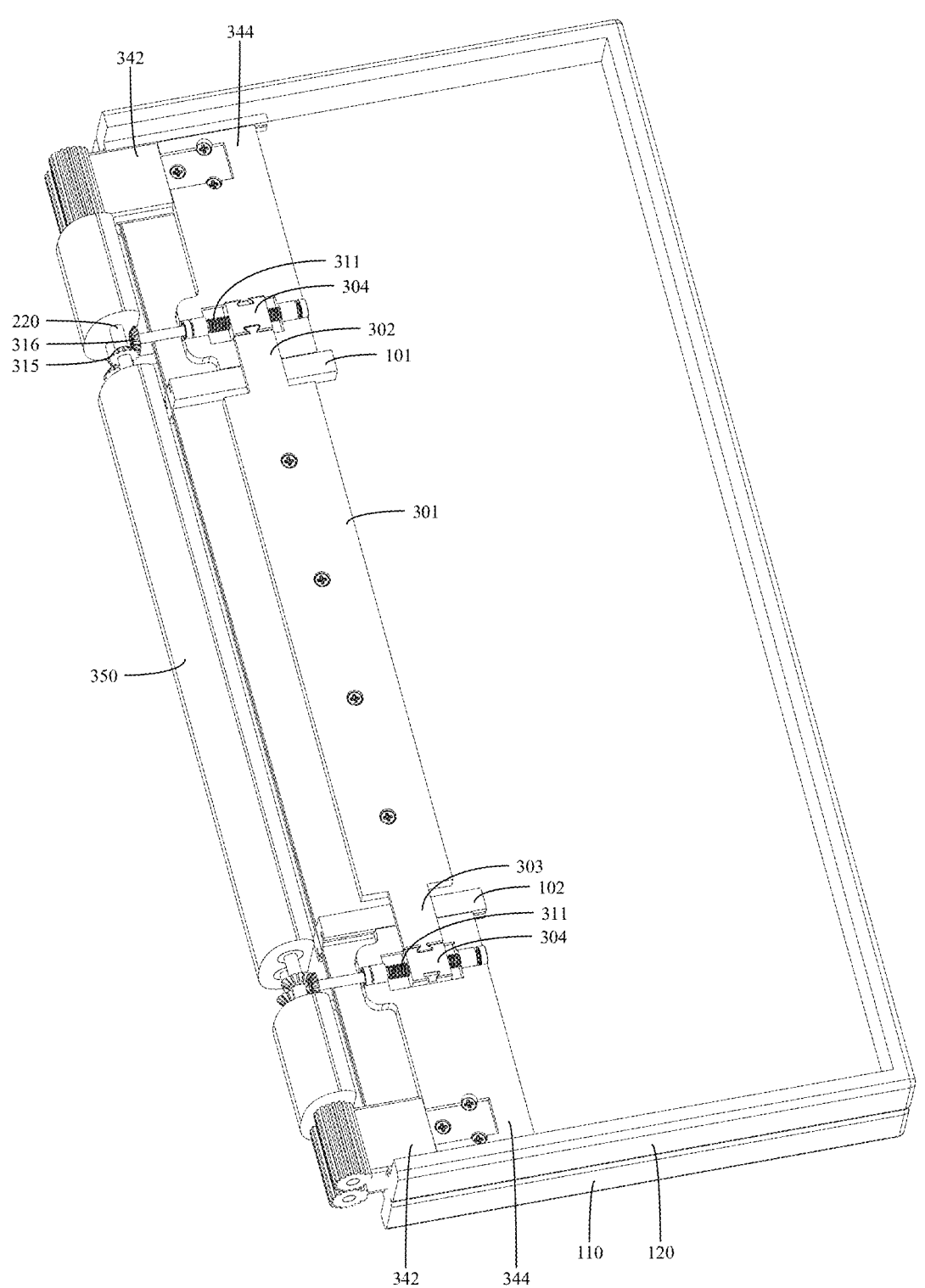
FIG. 8 is a schematic diagram of a partial structure of an electronic device disclosed in an embodiment of this application when the electronic device is in a folded state.
Figure 9:
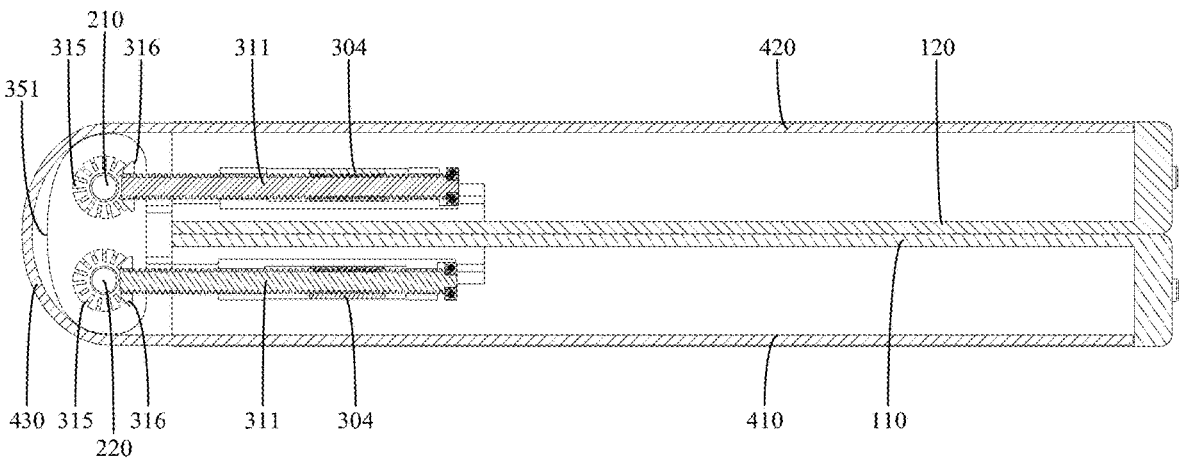
FIG. 9 is a sectional view when an electronic device disclosed in an embodiment of this application is in a folded state.
Figure 10:
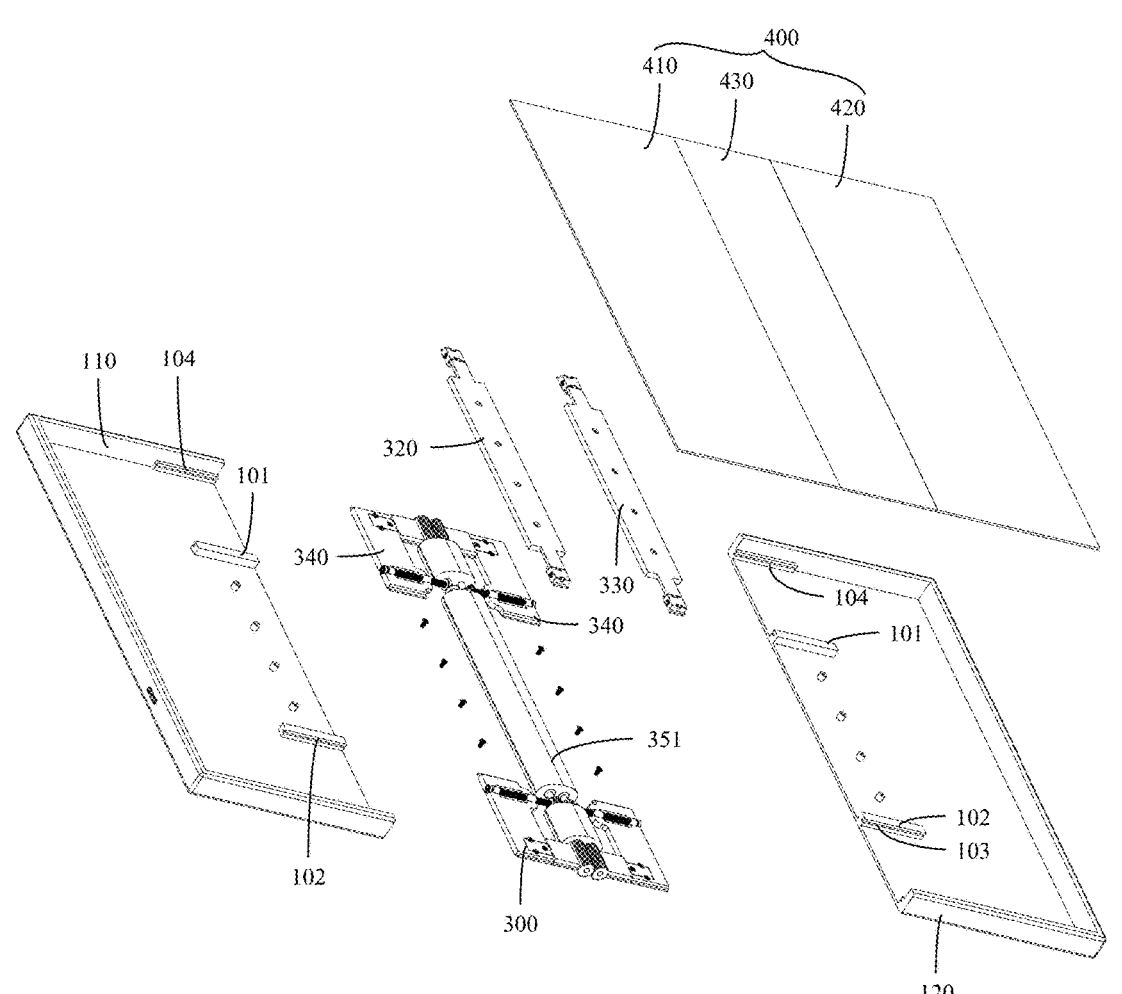
FIG. 10 is an exploded view of an electronic device disclosed in an embodiment of this application.
Figure 11:
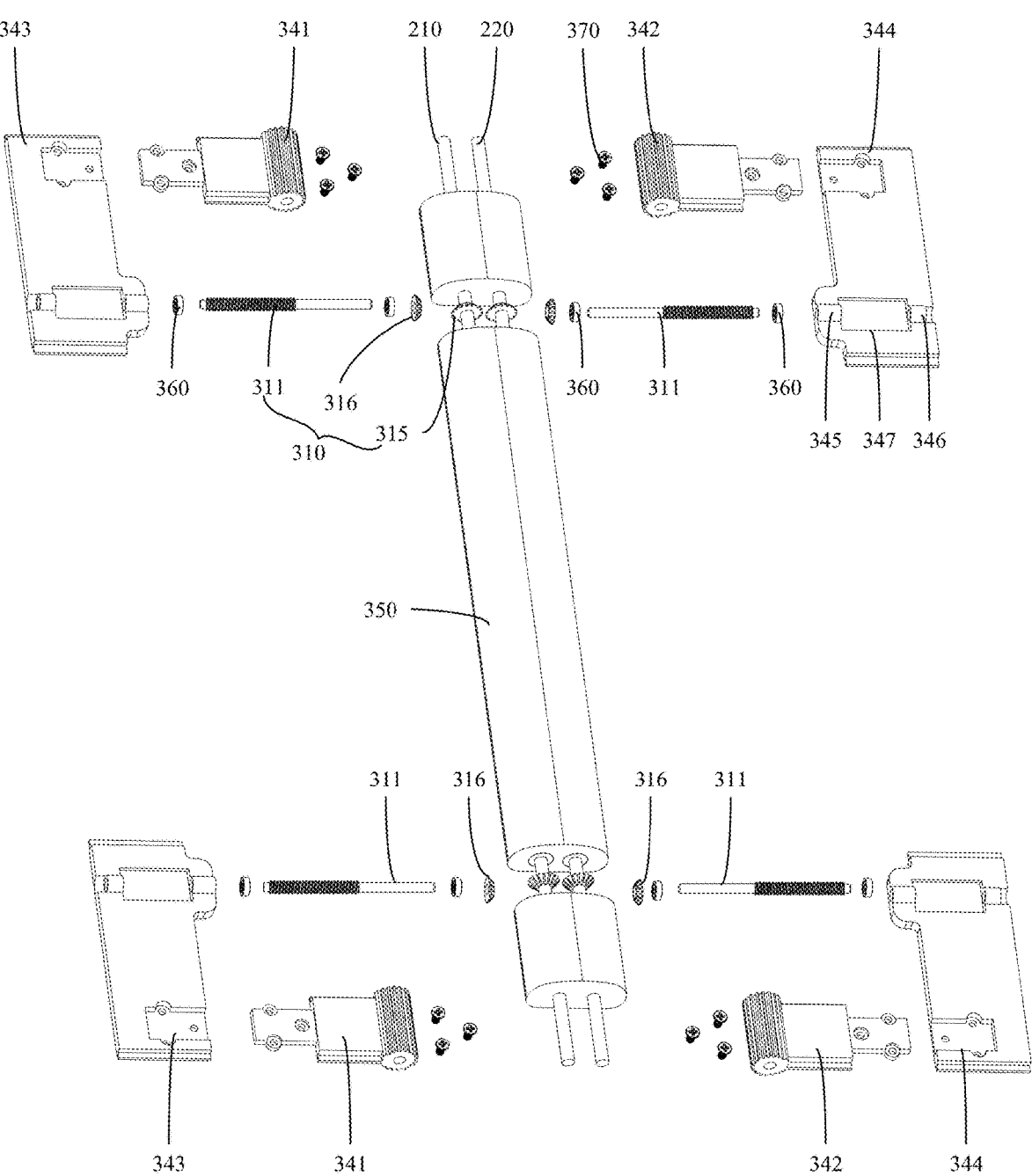
FIG. 11 is an exploded view of rotating shafts and a rotating mechanism disclosed in an embodiment of this application.
Figure 12:
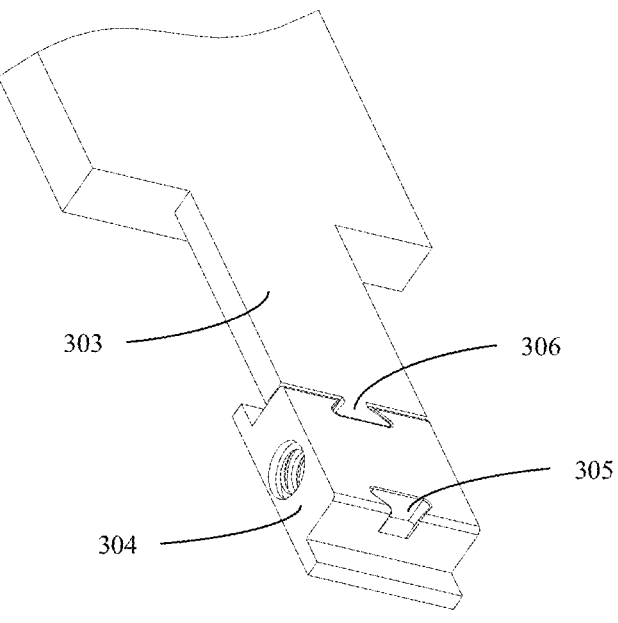
FIG. 12 is a partial enlargement view of a first moving member disclosed in an embodiment of this application.

With reference to FIG. 1 to FIG. 12, embodiments of this application disclose an electronic device, which includes a first device body 110, a second device body 120, a rotating mechanism 300, and a flexible display screen 400.

The first device body 110 and the second device body 120 may be used as basic parts of the electronic device, so as to provide a mounting basis for components such as the flexible display screen 400, a circuit board, and a battery. Both the first device body 110 and the second device body 120 may include components such as a frame and a mainboard upper-cover connected to the frame. The first device body 110 is rotatably connected to the second device body 120 by using the rotating mechanism 300, and the first device body 110 and the second device body 120 may rotate relative to each other to enable the electronic device to be switched between a folded state and an unfolded state. In other words, in a process of folding or unfolding the electronic device, the first device body 110 and the second device body 120 may rotate relative to each other. When the electronic device is in the unfolded state, a display area of the flexible display screen 400 is relatively large, so as to meet a user requirement for a large display screen. When the electronic device is in the folded state, an overall size of the electronic device is relatively small, so as to facilitate the user to carry and hold the electronic device.

The flexible display screen 400 includes a first display screen 410, a second display screen 420, and a third display screen 430. The first display screen 410 is connected to the second display screen 420 through the third display screen 430, so that the three display screens may be fixedly concatenated into a whole display area. The first display screen 410, the second display screen 420, and the third display screen 430 may also be independently displayed. The first device body 110 may be connected to the first display screen 410 in an adhesive manner or the like, and the second device body 120 may be connected to the second display screen 420 in an adhesive manner or the like. Therefore, in a process of folding or unfolding the electronic device, driven by the first device body 110 and the second device body 120, the first display screen 410 and the second display screen 420 may rotate relative to each other, and the third display screen 430 may be deformed to adapt to a change of an angle between the first display screen 410 and the second display screen 420.

The flexible display screen 400 may be an outward-folding display screen. To be specific, in a case that the electronic device is in the folded state, both the first device body 110 and the second device body 120 are located between the first display screen 410 and the second display screen 420. In this case, the first device body 110 and the second device body 120 are located in space enclosed by the flexible display screen 400. In some embodiments, the flexible display screen 400 may alternatively be an inward-folding display screen. To be specific, in a case that the electronic device is in the folded state, both the first display screen 410 and the second display screen 420 are located between the first device body 110 and the second device body 120. In this case, both the first display screen 410 and the second display screen 420 are located in space between the first device body 110 and the second device body 120. Relatively speaking, when the flexible display screen 400 is an inward-folding display screen, in a case that the electronic device is in the folded state, the flexible display screen 400 is prone to creases due to squeezing from the first device body 110 and the second device body 120, and particles such as dust from an external environment are prone to enter the electronic device or the flexible display screen 400 because the flexible display screen 400 cannot be fully attached. When the flexible display screen 400 is an outward-folding display screen, the first device body 110 and the second device body 120 basically do not squeeze the flexible display screen 400. Therefore, the flexible display screen 400 is less prone to creases, and particles such as dust from an external environment are less prone to enter the electronic device or the flexible display screen 400 because the flexible display screen 400 cannot be fully attached. In addition, the outward-folding screen is always exposed. Therefore, display may be implemented through the flexible display screen 400 regardless of whether the electronic device is in the folded state or unfolded state, so as to better meet a display requirement of the user.

The rotating mechanism 300 includes rotating shafts and a transmission apparatus 310, and the rotating shafts are connected to at least one of the first device body 110 or the second device body 120 through the transmission apparatus 310. In a process of folding or unfolding the electronic device, the first device body 110 and the second device body 120 may rotate around the rotating shafts. In a process of folding or unfolding the electronic device, the transmission apparatus 310 may transfer an acting force output by the rotating shafts to the at least one of the first device body 110 or the second device body 120, so as to enable the at least one of the first device body 110 or the second device body 120 to move under triggering of a folding operation or an unfolding operation. The at least one of the first device body 110 or the second device body 120 may be defined as a target device body. In a process of folding or unfolding the electronic device, a distance between the target device body and the rotating shafts may dynamically change, and a distance between the target device body and the rotating shafts may be defined as a first distance. The first distance changes with a change of an included angle between the first device body 110 and the second device body 120, and the change of the included angle herein causes a change of a bending angle of the flexible display screen 400. Therefore, there is a correspondence between the first distance and the bending angle of the flexible display screen 400.

Only one transmission apparatus 310 may be disposed, and the rotating shafts are only connected to the first device body 110 or the second device body 120 through the transmission apparatus 310. In some embodiments, at least two transmission apparatuses 310 are disposed, the rotating shafts are connected to the first device body 110 through at least one transmission apparatus 310, and the rotating shafts are connected to the second device body 120 through the other at least one transmission apparatus 310. In addition, the rotating shafts may be connected to the first device body 110 through the at least two transmission apparatuses 310, or the rotating shafts may be connected to the second device body 120 through the at least two transmission apparatuses 310, so as to improve connection reliability. When there are at least two transmission apparatuses 310, a specific structure of each transmission apparatus 310 may be the same or different. This is not limited in the embodiments of this application.

In a case that the electronic device is switched from the folded state to the unfolded state, the rotating shafts drive, through the transmission apparatus 310, the at least one of the first device body 110 or the second device body 120 to be away from the rotating shafts, so that a support length of the first device body 110 and the second device body 120 for the flexible display screen 400 increases, so as to prevent the third display screen 430 of the flexible display screen 400 from being wrinkled and layered due to squeezing. In a case that the electronic device is switched from the unfolded state to the folded state, the rotating shafts drive, through the transmission apparatus 310, the at least one of the first device body 110 or the second device body 120 to be close to the rotating shafts, so that a support length of the first device body 110 and the second device body 120 for the flexible display screen 400 decreases, so as to prevent the third display screen 430 of the flexible display screen 400 from being fractured due to excessive stretching. It can be learned that the first device body 110 and the second device body 120 may move relative to the rotating shafts with folding or unfolding of the electronic device, so that the flexible display screen 400 is not damaged due to folding or unfolding of the electronic device. Therefore, a service life of the flexible display screen 400 is longer.

In some embodiments, only one rotating shaft may be disposed. The rotating shaft may be connected to the first device body 110 or the second device body 120 only through the transmission apparatus 310. However, such disposing may lead to a relatively long moving stroke of the first device body 110 or the second device body 120. In addition, in a process of folding or unfolding the electronic device, a center of gravity of the entire electronic device is prone to be unstable. Therefore, in another embodiment, there may be at least two rotating shafts which include a first shaft 210 and a second shaft 220. The first shaft 210 and the second shaft 220 may be parallel to each other. The first shaft 210 may be connected to the first device body 110 through at least one transmission apparatus 310, and the second shaft 220 may be connected to the second device body 120 through at least one transmission apparatus 310. In a case that the electronic device is switched from the folded state to the unfolded state, the first shaft 210 drives, through the transmission apparatus 310, the first device body 110 to be away from the rotating shafts, and the second shaft 220 drives, through the transmission apparatus 310, the second device body 120 to be away from the rotating shafts. In a case that the electronic device is switched from the unfolded state to the folded state, the first shaft 210 drives, through the transmission apparatus 310, the first device body 110 to be close to the rotating shafts, and the second shaft 220 drives, through the transmission apparatus 310, the second device body 120 to be close to the rotating shafts.

Further, the rotating mechanism 300 includes a rotating shaft bracket 350. The rotating shaft bracket 350 is provided with a first perforation 3501 and a second perforation 3502, one end of the first shaft 210 passes through the first perforation 3501, and one end of the second shaft 220 passes through the second perforation 3502. In other words, the first shaft 210 may be connected to the second shaft 220 through the rotating shaft bracket 350. In some embodiments, the rotating shaft bracket 350 is provided with an arc-shaped support surface 351. In a case that the electronic device is in the folded state, the arc-shaped support surface 351 faces the third display screen 430. In a case that the electronic device is in the folded state, the arc-shaped support surface 351 may be in contact with the third display screen 430, so as to support the third display screen 430. In some embodiments, there may be a small gap between the arc-shaped support surface 351 and the third display screen 430. When the third display screen 430 is squeezed, the third display screen 430 is in contact with the arc-shaped support surface 351, so as to support the third display screen 430. In this case, the rotating shaft bracket 350 may not only be connected to the first shaft 210 and the second shaft 220, and also may support the third display screen 430 at an appropriate timing, so as to improve flatness of the third display screen 430, facilitate the user to perform a touch operation, and protect the third display screen 430.

When the flexible display screen 400 is an inward-folding display screen, the arc-shaped support surface 351 disposed on the rotating shaft bracket 350 may be an inner concave surface, and the inner concave surface is concave in a direction away from the third display screen 430, so as to increase a support area of the arc-shaped support surface 351 for the third display screen 430. When the flexible display screen 400 is an outward-folding display screen, the arc-shaped support surface 351 disposed on the rotating shaft bracket 350 may be an outer convex surface, and the outer convex surface is convex in a direction close to the third display screen 430, so as to increase a support area of the arc-shaped support surface 351 for the third display screen 430.

In a process of folding or unfolding the electronic device, the first shaft 210 and the second shaft 220 rotate at the same time. To improve synchronization of rotation between the first shaft 210 and the second shaft 220, elastic members made of a material such as rubber may be disposed at ends of the first shaft 210 and the second shaft 220, to implement synchronous rotation between the first shaft 210 and the second shaft 220 through friction between the elastic members. However, it is easy to slip between the elastic members. Consequently, the synchronization between the first shaft 210 and the second shaft 220 is poor. To resolve this problem, in some embodiments, the rotating mechanism 300 further includes a support plate 340. There are at least two support plates 340. At least one support plate 340 is connected to the first shaft 210, and the other at least one support plate 340 is connected to the second shaft 220. The support plate 340 connected to the first shaft 210 includes a first gear part 341. The support plate 340 connected to the second shaft 220 includes a second gear part 342. The first gear part 341 is sleeved on the first shaft 210. The second gear part 342 is sleeved on the second shaft 220. The first gear part 341 meshes with the second gear part 342. The support plate 340 connected to the first shaft 210 may further include a part that is slidably connected to the first device body 110, and the support plate 340 connected to the second shaft 220 may further include a part that is slidably connected to the second device body 120. In a process of folding or unfolding the electronic device, the first gear part 341 meshes with the second gear part 342, so that the first device body 110 and the second device body 120 may rotate relative to each other, and the first gear part 341 and the second gear part 342 respectively drive the first shaft 210 and the second shaft 220 to rotate synchronously. Reliability of a transmission mode for gear meshing is higher. Therefore, this embodiment can improve synchronization when the first shaft 210 and the second shaft 220 rotate. In addition, meshing between the first gear part 341 and the second gear part 342 may form a certain damping in a process of folding or unfolding the electronic device, so as to prevent a problem such as a collision due to a fact that a relative rotation speed of the first device body 110 and the second device body 120 is too fast. A damping force between the first gear part 341 and the second gear part 342 may be optimized, so that the electronic device may be relatively easily folded or unfolded when the user exerts an acting force on the electronic device. In addition, when the user wants to keep the electronic device at any angle to remove the acting force, the first device body 110 and the second device body 120 may retain in a target location.

In some embodiments, the rotating mechanism 300 further includes a first moving member 320 and a second moving member 330. The rotating shafts are connected to the first moving member 320 through the transmission apparatus 310, and the rotating shafts are connected to the second moving member 330 through the transmission apparatus 310. The first moving member 320 is connected to the first device body 110, and the second moving member 330 is connected to the second device body 120. The first moving member 320 may be fastened to the first device body 110 by using a connection structure such as a threaded screw, and the second moving member 330 may also be fastened to the second device body 120 by using a connection structure such as a threaded screw. Both the first moving member 320 and the second moving member 330 may use a long strip structure. The first moving member 320 and the second moving member 330 may be parallel to the rotating shafts, so as to facilitate layout design of the electronic device. In addition, a connection area between the first moving member 320 and the first device body 110 is larger, and a connection area between the second moving member 330 and the second device body 120 is larger, so as to reliably drive the first device body 110 and the second device body 120 to move through the first moving member 320 and the second moving member 330. In a case that the electronic device is switched from the folded state to the unfolded state, the rotating shafts drive, through the transmission apparatus 310, the first moving member 320 and the second moving member 330 to be away from the rotating shafts. In a case that the electronic device is switched from the unfolded state to the folded state, the rotating shafts drive, through the transmission apparatus 310, the first moving member 320 and the second moving member 330 to be close to the rotating shafts.

When the rotating mechanism 300 further includes the support plate 340, the support plate 340 may be used as a disposing basis of the transmission apparatus 310, so as to facilitate mounting of the transmission apparatus 310. The transmission apparatus 310 may convert rotating of the rotating shafts into moving of the first device body 110 and/or the second device body 120. There are many solutions for implementing this purpose. For example, the transmission apparatus 310 may include a gear rack mechanism or the like. In some embodiments, the transmission apparatus 310 may include a lead screw 311. The lead screw 311 is rotatably disposed on the support plate 340, the first moving member 320 or the second moving member 330 is provided with a threaded hole, and the lead screw 311 is in threaded transmission fit with the threaded hole. To be specific, the first moving member 320 may be provided with a threaded hole, and the lead screw 311 connected to the first moving member 320 is in threaded transmission fit with the threaded hole. The second moving member 330 may be provided with a threaded hole, and the lead screw 311 connected to the second moving member 330 is in threaded transmission fit with the threaded hole. In some embodiments, only the first moving member 320 or the second moving member 330 is provided with a threaded hole, or both the first moving member 320 and the second moving member 330 are provided with threaded holes, and different lead screws 311 are in threaded transmission fit with different threaded holes. A transmission mode through the lead screw 311 and the threaded hole has characteristics such as high reliability, a simple structure, and small occupied space.

In some embodiments, the lead screw 311 may be perpendicular to the rotating shafts, so that a moving direction of the first moving member 320 is consistent with a moving direction of the first device body 110, a moving direction of the second moving member 330 is consistent with a moving direction of the second device body 120, and no additional structure needs to be disposed to convert a transmission direction, so as to simplify a structure of the electronic device.

The first moving member 320 may use an integrated structure. However, a part of the threaded hole provided by the first moving member 320 is vulnerable to damage. If the integrated structure is used, the first moving member 320 needs to be replaced as a whole once a problem such as screw slippage occurs in the threaded hole, resulting in relatively high maintenance costs of the electronic device. Therefore, in another embodiment, the first moving member 320 may include a connecting member and a slider 304 that are disposed separately. The connecting member is connected to the first device body 110, the slider 304 is detachably connected to the connecting member, the slider 304 is slidably connected to the support plate 340, and the slider 304 is provided with a threaded hole. When a problem such as screw slippage occurs in the threaded hole provided by the slider 304 of the first moving member 320, only the slider 304 of the first moving member 320 needs to be replaced, and the connecting member may not be replaced. Therefore, this embodiment can reduce maintenance costs of the electronic device.

Similarly, the second moving member 330 may use an integrated structure. However, a part of the threaded hole provided by the second moving member 330 is vulnerable to damage. If the integrated structure is used, the second moving member 330 needs to be replaced as a whole once a problem such as screw slippage occurs in the threaded hole, resulting in relatively high maintenance costs of the electronic device. Therefore, in another embodiment, the second moving member 330 may include a connecting member and a slider 304 that are disposed separately. The connecting member is connected to the second device body 120, the slider 304 is detachably connected to the connecting member, the slider 304 is slidably connected to the support plate 340, and the slider 304 is provided with a threaded hole. When a problem such as screw slippage occurs in the threaded hole provided by the slider 304 of the second moving member 330, only the slider 304 of the second moving member 330 needs to be replaced, and the connecting member may not be replaced. Therefore, this embodiment can reduce maintenance costs of the electronic device.

The support plate 340 may be configured to mount the lead screw 311. In some embodiments, the support plate 340 is provided with a first mounting hole 345, a second mounting hole 346, and an accommodating hole 347. The accommodating hole 347 is located between the first mounting hole 345 and the second mounting hole 346, the lead screw 311 is in running fit with the first mounting hole 345 and the second mounting hole 346, and the slider 304 is in sliding fit with the accommodating hole 347. In some embodiments, the first mounting hole 345 and the second mounting hole 346 may be round holes, the accommodating hole 347 may be a rectangular hole, and the accommodating hole 347 may be a blind hole, or may be a through hole. The first mounting hole 345 and the second mounting hole 346 match with a smooth section of the lead screw 311, so that the lead screw 311 may rotate relative to the support plate 340, and the support plate 340 may limit a location of the lead screw 311. In addition, both the first mounting hole 345 and the second mounting hole 346 match with the lead screw 311. Therefore, a connection between the support plate 340 and the lead screw 311 is more reliable. First, the accommodating hole 347 may be in sliding fit with the slider 304, so as to restrict rotation of the slider 304, so that the slider 304 can only move and not rotate under an action of the lead screw 311. Second, the accommodating hole 347 may avoid the slider 304, that is, the slider 304 may be disposed by using space occupied by the support plate 340, so that additional space occupied by the slider 304 is smaller, and it is more convenient for structural design of the electronic device.

In some embodiments, the lead screw 311 may be connected to the first mounting hole 345 and the second mounting hole 346 through a bearing 360, so as to alleviate wear caused by rotation of the lead screw 311.

The support plate 340 may be of an integrated structure. The support plate 340 includes the first gear part 341 or the second gear part 342, and includes a part that is configured to connect to the lead screw 311. Once a wear amount of the first gear part 341 or the second gear part 342 exceeds an acceptable range, the support plate 340 needs to be replaced as a whole, resulting in relatively high maintenance costs of the electronic device. Therefore, in some embodiments, the support plate 340 connected to the first device body 110 may include the first gear part 341 and a first mounting part 343. The first mounting part 343 is connected to the lead screw 311. The first gear part 341 and the first mounting part 343 are disposed separately. The first gear part 341 and the first mounting part 343 may be detachably connected by using a structure such as a threaded screw 370. When a wear amount of the first gear part 341 exceeds an acceptable range, only the first gear part 341 is replaced.

Similarly, the support plate 340 connected to the second device body 120 may include the second gear part 342 and a second mounting part 344. The second mounting part 344 is connected to the lead screw 311. The second gear part 342 and the second mounting part 344 are disposed separately. The second gear part 342 and the second mounting part 344 may be detachably connected by using a structure such as a threaded screw 370. When a wear amount of the second gear part 342 exceeds an acceptable range, only the second gear part 342 is replaced.

The slider 304 and the connecting member may be detachably fastened by using a structure such as a threaded screw, or may be detachably fastened in a manner such as snap-fit and plug-in connections. In some embodiments, the slider 304 is provided with a slot 305, the connecting member is provided with an insertion protrusion 306, and the insertion protrusion 306 matches with the slot 305, so as to connect the slider 304 and the connecting member together, thereby implementing power transfer between the slider 304 and the connecting member. In some embodiments, the slot 305 and the insertion protrusion 306 may be disposed interchangeably. To be specific, the slider 304 is provided with the insertion protrusion 306, the connecting member is provided with the slot 305, and the insertion protrusion 306 matches with the slot 305. A fastener such as a threaded screw is not required when the slider 304 is connected to the connecting member in a manner of matching the slot 305 with the insertion protrusion 306. Therefore, a structure of the electronic device can be simplified, and it is convenient for a connection between the slider 304 and the connecting member.

In some embodiments, an insertion direction of the insertion protrusion 306 may be a thickness direction of the first device body 110 or the second device body 120, the slot 305 may be a tapered slot, and the insertion protrusion 306 may be a tapered convex part that matches a shape of the slot 305. In other words, in a direction in which the connecting member extends toward the slider 304, a cross-sectional area of the slot 305 gradually increases, and a cross-sectional area of the insertion protrusion 306 also gradually increases, where the cross-sectional area herein means a cross-sectional area perpendicular to the rotating shafts. The tapered slot 305 matches with the tapered insertion protrusion 306, so that a relative displacement of the insertion protrusion 306 and the slot 305 can be limited in a plurality of directions, so as to enable the slider 304 and the connecting member to be more reliably connected together.

Only a single side of the slider 304 may be provided with the slot 305 or the insertion protrusion 306. When the slider 304 and the connecting member are connected, attention needs to be paid to a mounting direction of the slider 304, so as to ensure that the slot 305 matches with the insertion protrusion 306. Therefore, this structure limits the mounting direction of the slider 304 and does not facilitate assembling of the electronic device. Therefore, to facilitate assembling of the electronic device, both sides of the slider 304 may be provided with the slot 305, or both sides of the slider 304 may be provided with the insertion protrusion 306. When the electronic device is assembled, the slot 305 or the insertion protrusion 306 on either side of the slider 304 may match with a corresponding structure on the connecting member. Therefore, in some embodiments, the slider 304 does not need to be disposed, so as to facilitate assembling of the electronic device. In addition, when the slot 305 or the insertion protrusion 306 disposed on one side of the slider 304 is damaged and cannot match with the connecting member, only a mounting direction of the slider 304 needs to be replaced, so that the slider 304 and the connecting member may be connected through the slot 305 or the insertion protrusion 306 on the other side of the slider 304, and a whole replacement of the slider 304 is not required. Therefore, this embodiment may further reduce maintenance costs of the electronic device.

The slider 304 needs to surround the lead screw 311. Therefore, a thickness of the slider 304 is relatively large, and a main function of the connecting member is to connect the first device body 110 or the second device body 120. If a thickness of the connecting member is equal to or even greater than the thickness of the slider 304, space occupied by the connecting member is relatively large, resulting in a waste of space in the electronic device. Based on this, the thickness of the slider 304 may be greater than the thickness of the connecting member. Such disposing not only ensures that the slider 304 and the lead screw 311 have a sufficiently large matching area, but also does not affect a connection between the connecting member and the first device body 110 or the second device body 120, and space occupied by the connecting member may be reduced, so that there is more space to dispose another component in the electronic device.

In some embodiments, the connecting member may include a body part 301, and a first connecting part 302 and a second connecting part 303 that are disposed at two ends of the body part 301. The body part 301 may be connected to the first device body 110 or the second device body 120. For example, the body part 301 may be connected to the first device body 110 or the second device body 120 by using a structure such as a threaded screw. The first connecting part 302 and the second connecting part 303 are respectively connected to different sliders 304, so that both ends of the body part 301 may be connected to the transmission apparatus 310, to enable the rotating shafts to more reliably drive at least one of the first device body 110 or the second device body 120 to move.

As described above, the body part 301 is mainly configured to connect the first device body 110 or the second device body 120. Therefore, a thickness of the body part 301 has a great impact on a strength of a connection between the body part 301 and the first device body 110 or the second device body 120. At the same time, the first connecting part 302 and the second connecting part 303 are mainly configured to transfer an acting force. Therefore, a thickness of the first connecting part 302 and the second connecting part 303 can only meet a requirement for transferring an acting force. Based on this, the thickness of the body part 301 may be greater than the thickness of the first connecting part 302 and/or the thickness of the second connecting part 303, so that the strength of the connection between the body part 301 and the first device body 110 or the second device body 120 is improved, and the thickness of the first connecting part

302 and the second connecting part 303 are appropriately reduced. Such disposing can not only meet a requirement for transferring an acting force, but also reduce space occupied by the connecting member, so as to facilitate layout of another component.

In some embodiments, a first support part 101 and a second support part 102 are disposed in the first device body 110. The first support part 101 is connected to the first connecting part 302, the second support part 102 is connected to the second connecting part 303. In other words, the first support part 101 may support the first connecting part 302, and the second support part 102 may support the second connecting part 303. Compared with a solution in which a cantilever of the first connecting part 302 and the second connecting part 303 is disposed, after the first support part 101 and the second support part 102 are added, two ends of the connecting member are respectively supported by the first support part 101 and the second support part 102. In this way, the first connecting part 302 and the second connecting part 303 are not easily bent, and a structural strength of the first connecting part 302 and the second connecting part 303 are further improved, to enable the connecting member to more reliably transfer the acting force.

When the thickness of the body part 301 is greater than the thickness of the first connecting part 302 and/or the thickness of the second connecting part 303, a part that is of the body part 301 and that protrudes from the first connecting part 302 and the second connecting part 303 may deviate from the first support part 101 and the second support part 102. In this case, a gap between the body part 301 and the first device body 110 is greater, which is not conducive for a connection between the body part 301 and the first device body 110. Therefore, in some embodiments, a part that is of the body part 301 and that protrudes from the first connecting part 302 and the second connecting part 303 may face the first support part 101 and the second support part 102. In other words, in an axis direction of the rotating shafts, at least a part of the body part 301 is located between the first support part 101 and the second support part 102. After this structure is used, a gap between the body part 301 and the first device body 110 is smaller. Therefore, it is conducive for the connection between the body part 301 and the first device body 110. At the same time, the body part 301 may use a part of space between the first support part 101 and the second support part 102. Therefore, additional space occupied by the connecting member is smaller, and it is more convenient for layout of another component.

Further, at least one of the first support part 101 or the second support part 102 is provided with a first sliding slot 103. A side wall of the first device body 110 is provided with a second sliding slot 104, and two sides of the support plate 340 are respectively in sliding fit with the first sliding slot 103 and the second sliding slot 104. In some embodiments, the first support part 101 and the second support part 102 use a strip structure, and the first support part 101 and the second support part 102 may extend in a direction perpendicular to the rotating shafts. This embodiment fully uses the first support part 101 and the second support part 102 to form a guide structure. The guide structure may provide a guide for moving of the support plate 340, so that relative rotation between the first device body 110 and the second device body 120 is smoother. In addition, in a process of folding or unfolding the electronic device, a certain damping may be formed, so as to prevent a problem such as a collision due to a fact that a relative rotation speed of the first device body 110 and the second device body 120 is too fast.

It should be noted that the foregoing describes a solution in which the first support part 101 and the second support part 102 are disposed in the first device body 110. In another embodiment, the first support part 101 and the second support part 102 may be disposed in the second device body 120. The first support part 101 may support the first connecting part 302 of the connecting member connected to the second device body 120, the second support part 102 may support the second connecting part 303 of the connecting member connected to the second device body 120, and a structure of the first support part 101, the second support part 102, and the connecting member that is connected to the second device body 120 may also use the foregoing solutions. For brevity, details are not described herein again in this specification. Both the first support part 101 and the second support part 102 may be disposed in the first device body 110 and the second device body 120.

Transmission between the rotating shafts and the lead screw 311 may be implemented by using a worm wheel and worm screw mechanism, or may be implemented through a bevel gear. Relatively speaking, transmission efficiency of the bevel gear is higher. Therefore, to improve the transmission efficiency, the transmission apparatus 310 in embodiments of this application further includes a first bevel gear 315 and a second bevel gear 316. The first bevel gear 315 is sleeved on the rotating shafts, the second bevel gear 316 is sleeved on the lead screw 311, and the first bevel gear 315 meshes with the second bevel gear 316. A transmission ratio of the first bevel gear 315 and the second bevel gear 316 is adjusted, so that a moving stroke of the first device body 110 and the second device body 120 may be adjusted, so as to enable the moving stroke to better match a posture of the electronic device.

When the rotating mechanism 300 further includes the rotating shaft bracket 350, the rotating shaft bracket 350 may use an integrated structure. However, the first gear part 341, the second gear part 342, and the first bevel gear 315 need to be sleeved on the rotating shafts at the same time, the first gear part 341 and the second gear part 342 are sleeved at an end of the rotating shafts, and there is a gap among the first bevel gear 315, the first gear part 341 and the second gear part 342. Therefore, to maximize a size of the rotating shaft bracket 350 to support the rotating shafts and the third display screen 430, a plurality of rotating shaft brackets 350 may be disposed. Each rotating shaft bracket 350 may be arranged in an axis direction of the rotating shafts, and the first bevel gear 315 may be located between adjacent rotating shaft brackets 350.

The electronic device disclosed in the embodiments of this application may be an electronic device such as a smartphone, a tablet computer, an e-book reader, a wearable device (for example, a smart watch), or a video game console. A type of the electronic device is not limited in the embodiments of this application.

The foregoing describes the embodiments of this application with reference to the accompanying drawings. However, this application is not limited to the foregoing specific implementations. The specific implementations are merely illustrative rather than restrictive. Inspired by this application, a person of ordinary skill in the art may develop many other manners without departing from the principle of this application and the protection scope of the claims, and all such manners fall within the protection scope of this application.

The invention claimed is:

1. An electronic device, comprising a first device body, a second device body, a rotating mechanism, and a flexible display screen, wherein the flexible display screen comprises a first display screen, a second display screen, and a third display screen;

the first device body is rotatably connected to the second device body by the rotating mechanism;

the first display screen is connected to the second display screen through the third display screen;

the first device body is connected to the first display screen, and the second device body is connected to the second display screen;

the rotating mechanism comprises a first moving member, a second moving member, at least one rotating shaft, and a transmission apparatus, wherein the at least one rotating shaft is connected to the first moving member through the transmission apparatus, the at least one rotating shaft is connected to the second moving member through the transmission apparatus, the first moving member is connected to the first device body, the second moving member is connected to the second device body, and the at least one rotating shaft is connected to at least one of the first device body or the second device body through the transmission apparatus; and the first device body and the second device body are rotatable relative to each other to switch the electronic device between a folded state and an unfolded state, wherein the at least one rotating shaft drives, through the transmission apparatus, at least one of the first device body or the second device body away from the at least one rotating shaft to switch the electronic device from the folded state to the unfolded state, and the at least one rotating shaft drives, through the transmission apparatus, at least one of the first device body or the second device body toward the at least one rotating shaft to switch the electronic device from the unfolded state to the folded state, wherein when the electronic device is switched from the folded state to the unfolded state, the at least one rotating shaft drives, through the transmission apparatus, the first moving member and the second moving member away from the at least one rotating shaft; and when the electronic device is switched from the unfolded state to the folded state, the at least one rotating shaft drives, through the transmission apparatus, the first moving member and the second moving member toward the at least one rotating shaft.

2. The electronic device according to claim 1, wherein the rotating mechanism further comprises a support plate, the at least one rotating shaft comprises a first shaft and a second shaft, the support plate comprises a first gear part and a second gear part, the first shaft is connected to the first gear part, the second shaft is connected to the second gear part, the first gear part is sleeved on the first shaft, the second gear part is sleeved on the second shaft, and the first gear part meshes with the second gear part.

3. The electronic device according to claim 2, wherein the rotating mechanism further comprises a rotating shaft bracket, the rotating shaft bracket is provided with a first perforation and a second perforation, one end of the first shaft passes through the first perforation, one end of the second shaft passes through the second perforation, and the rotating shaft bracket is provided with an arc-shaped support surface, wherein the arc-shaped support surface faces the third display screen when the electronic device is in the folded state.

4. The electronic device according to claim 1, wherein the rotating mechanism further comprises a support plate connected to the at least one rotating shaft, the transmission apparatus comprises a lead screw rotatably disposed on the support plate, the first moving member or the second moving member is provided with a threaded hole, and the lead screw is in threaded transmission fit with the threaded hole.

5. The electronic device according to claim 4, wherein at least one of the first moving member or the second moving member comprises a connecting member and a slider that are disposed separately, the connecting member is connected to the first device body or the second device body, the slider is detachably connected to the connecting member, the slider is slidably connected to the support plate, and the slider is provided with the threaded hole.

6. The electronic device according to claim 5, wherein the support plate is provided with a first mounting hole, a second mounting hole, and an accommodating hole, the accommodating hole is located between the first mounting hole and the second mounting hole, the lead screw is rotatably fit with the first mounting hole and the second mounting hole, and the slider is slidably fit with the accommodating hole.

7. The electronic device according to claim 5, wherein the slider is provided with a slot, the connecting member is provided with an insertion protrusion, and the insertion protrusion matches the slot; or the slider is provided with an insertion protrusion, the connecting member is provided with a slot, and the insertion protrusion matches the slot.

8. The electronic device according to claim 5, wherein a thickness of the slider is greater than a thickness of the connecting member.

9. The electronic device according to claim 5, wherein the connecting member comprises a body part, and a first connecting part and a second connecting part that are disposed at two ends of the body part, a thickness of the body part is greater than a thickness of the first connecting part or a thickness of the second connecting part, the body part is connected to the first device body or the second device body, and the first connecting part and the second connecting part are respectively connected to the slider.

10. The electronic device according to claim 9, wherein a first support part and a second support part are disposed in the first device body, the first support part is connected to the first connecting part, the second support part is connected to the second connecting part, and at least a part of the body part is located between the first support part and the second support part in an axis direction of the at least one rotating shaft.

11. The electronic device according to claim 10, wherein at least one of the first support part or the second support part is provided with a first sliding slot, a side wall of the first device body is provided with a second sliding slot, and two sides of the support plate are slidably fit with the first sliding slot and the second sliding slot respectively.

12. The electronic device according to claim 4, wherein the transmission apparatus further comprises a first bevel gear and a second bevel gear, the first bevel gear is sleeved on the at least one rotating shaft, the second bevel gear is sleeved on the lead screw, and the first bevel gear meshes with the second bevel gear.

13. The electronic device according to claim 1, wherein when the electronic device is in the folded state, both the first device body and the second device body are located between the first display screen and the second display screen.

* * * * *